United States Patent [19]

Maathuis et al.

[11] Patent Number: 5,007,974
[45] Date of Patent: Apr. 16, 1991

[54] METHOD OF MAKING A BELT OVERLAY FOR PNEUMATIC TIRES

[75] Inventors: Antonnis G. Maathuis, Fouhren, Netherlands; Jürgen Spielmann, Heisdorf, Luxembourg; Klaus Beer, Stow; Thomas R. Oare, Suffield, both of Ohio

[73] Assignee: The Goodyear Tire & Rubber Company, Akron, Ohio

[21] Appl. No.: 519,083

[22] Filed: May 4, 1990

Related U.S. Application Data

[62] Division of Ser. No. 363,812, Jun. 9, 1989, Pat. No. 4,989,658.

[51] Int. Cl.$^5$ .................. B29D 30/16; B29D 30/00; B60C 9/28
[52] U.S. Cl. .................. 156/117; 156/130; 156/121; 152/533; 152/538
[58] Field of Search .................. 156/110.1, 117, 121, 156/130, 130.3, 397, 405.1, 408, 410, 411; 152/526, 528, 529, 531, 532, 533, 536, 538

[56] References Cited

U.S. PATENT DOCUMENTS 3,991,803 11/1976 Praszek .
4,484,965 11/1984 Wagner .................. 156/117
4,869,307 9/1989 Bormann et al. .

FOREIGN PATENT DOCUMENTS 62-225406 6/1987 Japan .
62-203608 9/1987 Japan .................. 156/117
62-251202 11/1987 Japan .
62-251203 11/1987 Japan .
1-109108 4/1989 Japan .................. 152/528
2139575 11/1964 United Kingdom .
1569640 6/1980 United Kingdom .

OTHER PUBLICATIONS

U.S. Pat. Appln. 07/320,649 Filed Mar. 8, 1989, Thomas R. Oare et al., commonly owned along with the present application by the Goodyear Tire & Rubber Company, now abandoned.

Primary Examiner—John J. Gallagher
Assistant Examiner—Gregory J. Wilber
Attorney, Agent, or Firm—David E. Wheeler; Lonnie R. Drayer

[57] ABSTRACT

A method of making a belt overlay structure for a pneumatic tire is provided. In the method, a belt structure is wrapped circumferentially around a cylinder which is secured to a rotatable shaft, and a ribbon comprising an elastomeric substance containing side-by-side textile cords extending longitudinally in the ribbon is provided on a let-off means. A first end of the ribbon is adhered to the outermost belt ply in close proximity to the axial center line of the belt structure, and the cylinder is rotated while ribbon is supplied from the let-off device. The let-off device first traverses to a first lateral edge of the belt structure where the lateral movement of the let-off means stops while the cylinder continues to rotate and the let-off means continues to supply ribbon. The let-off means is then caused to supply more ribbon while traversing laterally to a second lateral edge of the belt structure and stopping at the second lateral edge while the cylinder continues to rotate and the let-off device continues to supply ribbon. The let-off means then traverses to the axial centerline of the belt structure, and the cylinder and the let-off means are then stopped, the ribbon cut and a second end of the ribbon is adhered to the underlying ribbon.

1 Claim, 5 Drawing Sheets

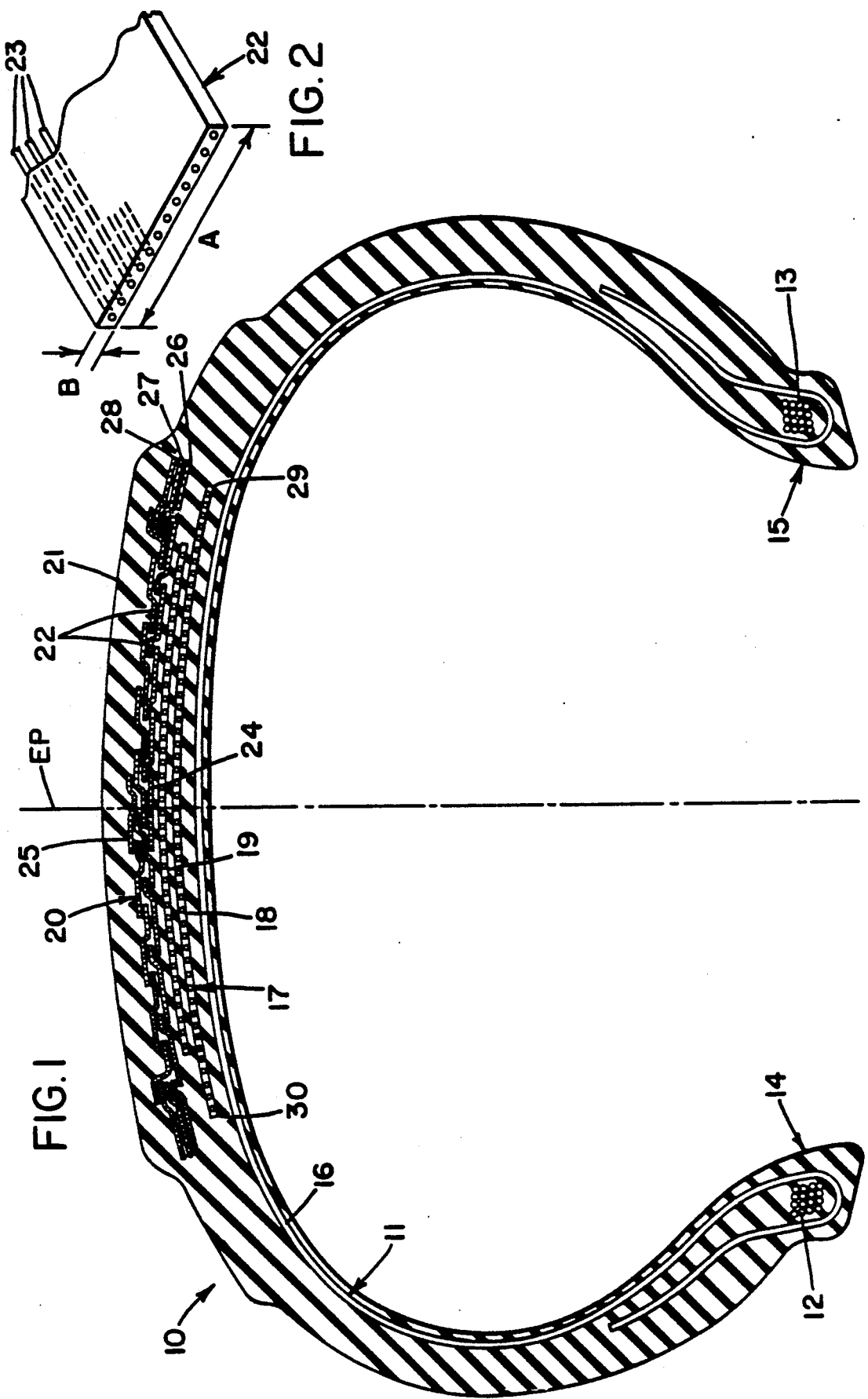

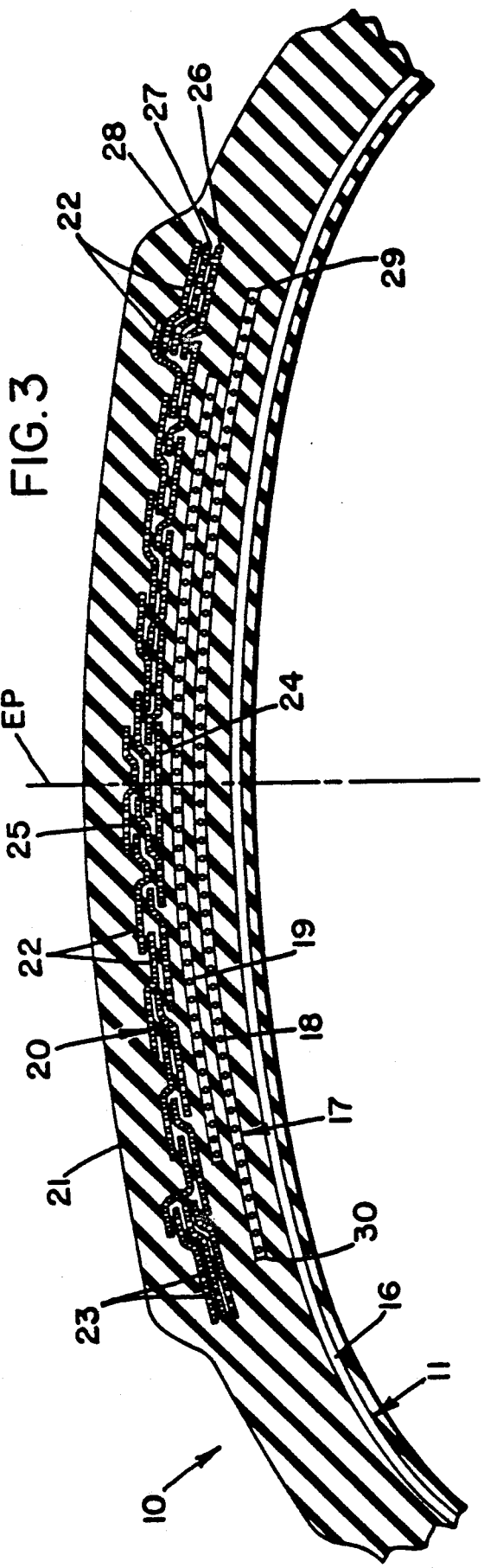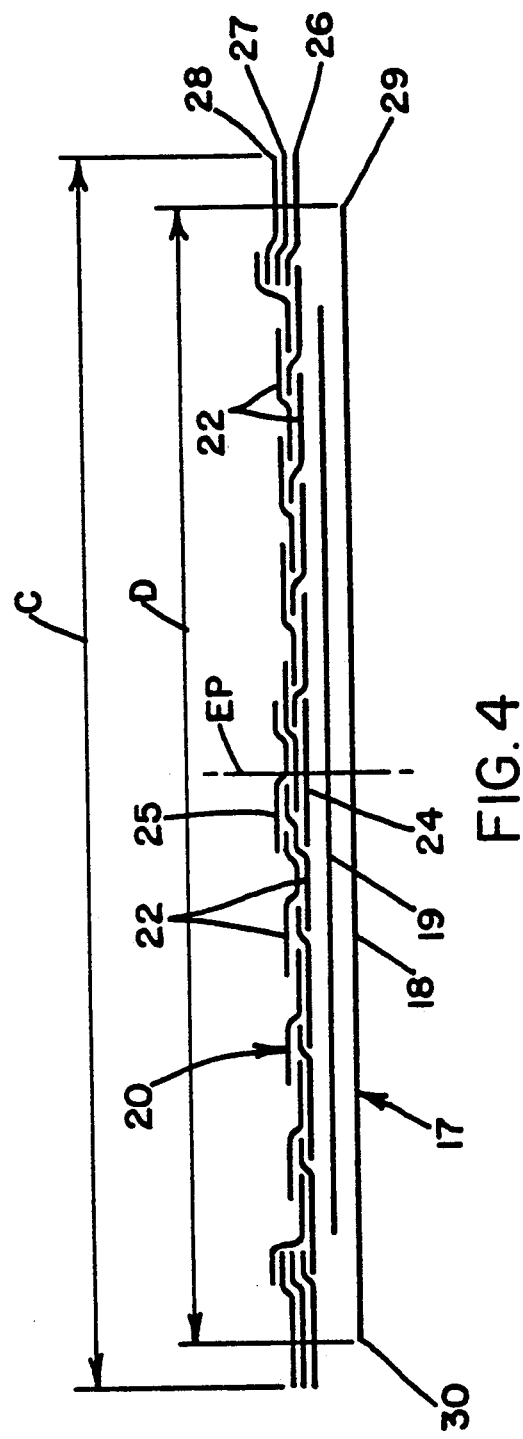

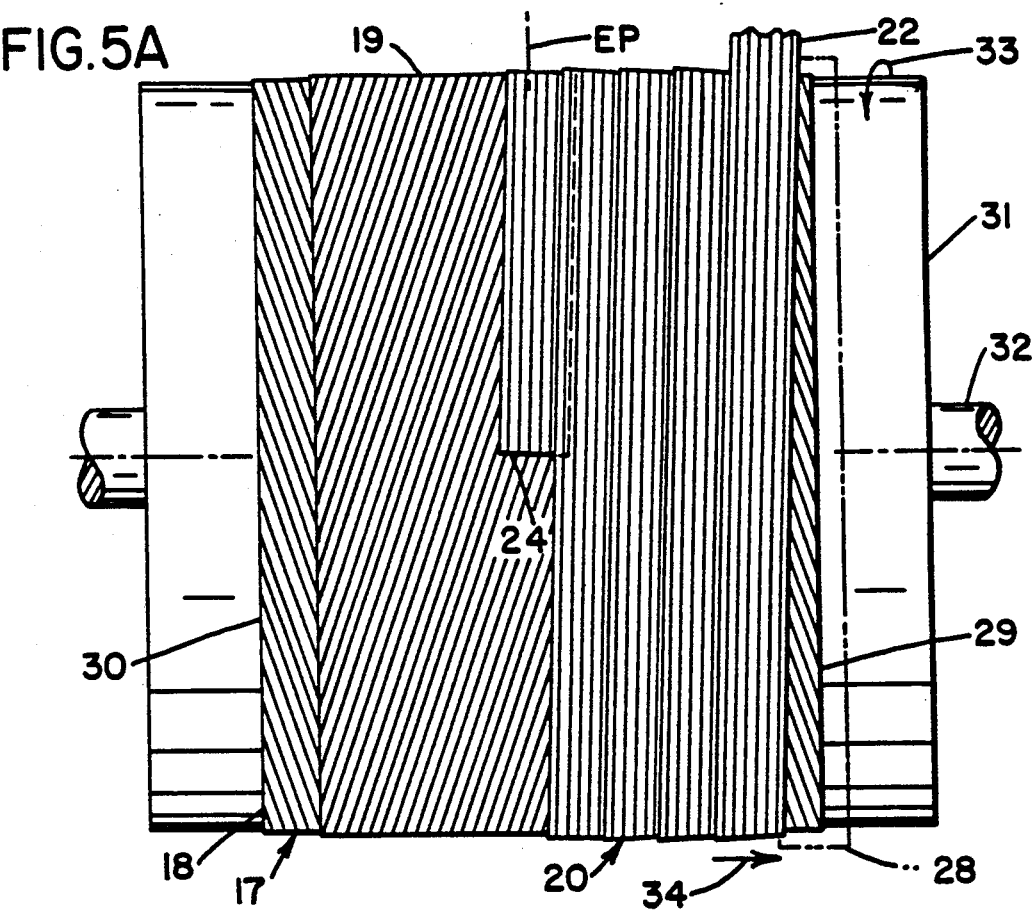
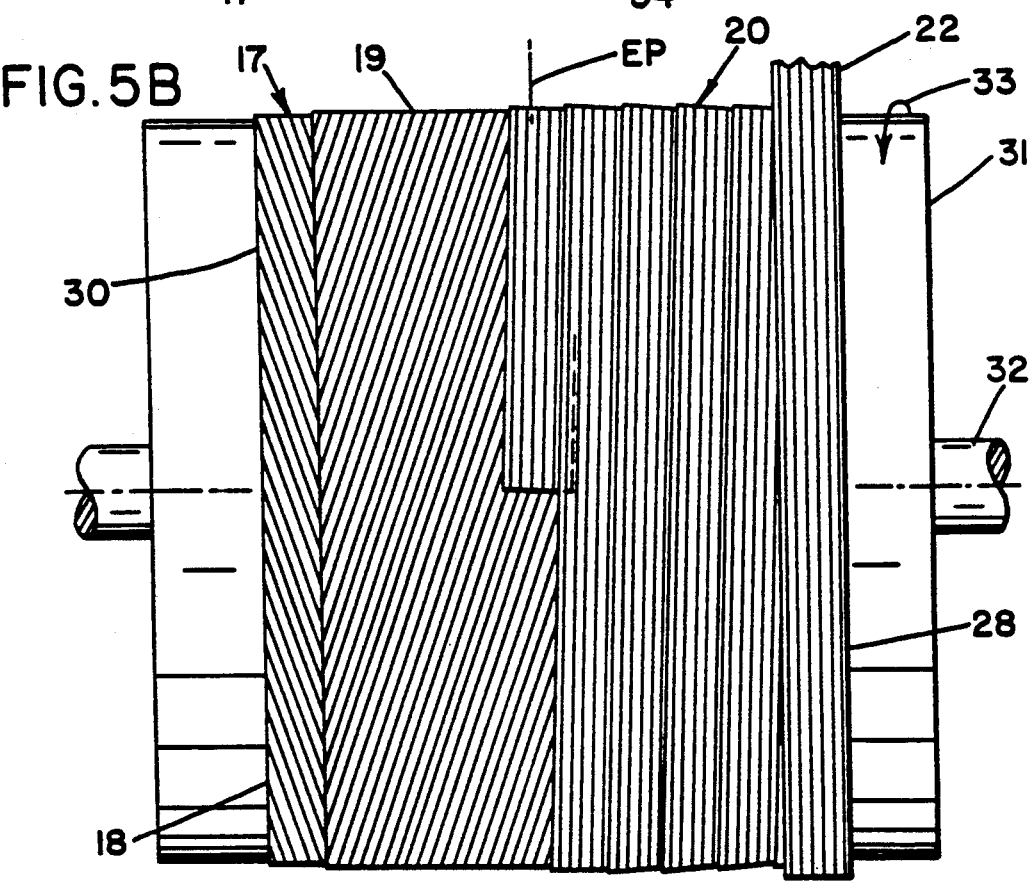

METHOD OF MAKING A BELT OVERLAY FOR PNEUMATIC TIRES

This is a division of Ser. No 363,812, filed June 9, 1989, now U.S. Pat. No. 4,989,658.

The present invention relates generally to pneumatic tires, and more specifically to pneumatic tires intended for use on high performance vehicles such as sports cars. As used herein, a "high performance" tire is a tire which has a speed rating of V or Z (a speed rating of V is up to 149 miles per hour and a speed rating of Z is over 149 miles per hour).

The features of the present invention which are believed to be novel are set forth with particularity in the appended claims. The present invention, both as to its structure and manner of operation, may best be understood by reference to the following detailed description, taken in accordance with the accompanying drawings in which:

FIG. 1 is a cross-sectional view of a tire according to the invention taken in a plane that contains the axis of rotation of the tire:

FIG. 2 is a schematic view of the ribbon utilized in the overlay structure of the invention:

FIG. 3 is an enlarged fragmentary view of the crown portion of cross-sectional view shown in FIG. 1;

FIG. 4 is a schematic view of a belt structure and overlay structure of a tire according to the present invention: and FIGS. 5A, 5B, 5C, 5D and 5E illustrate the steps of manufacturing an overlay structure according to the present invention.

Figure 5C:
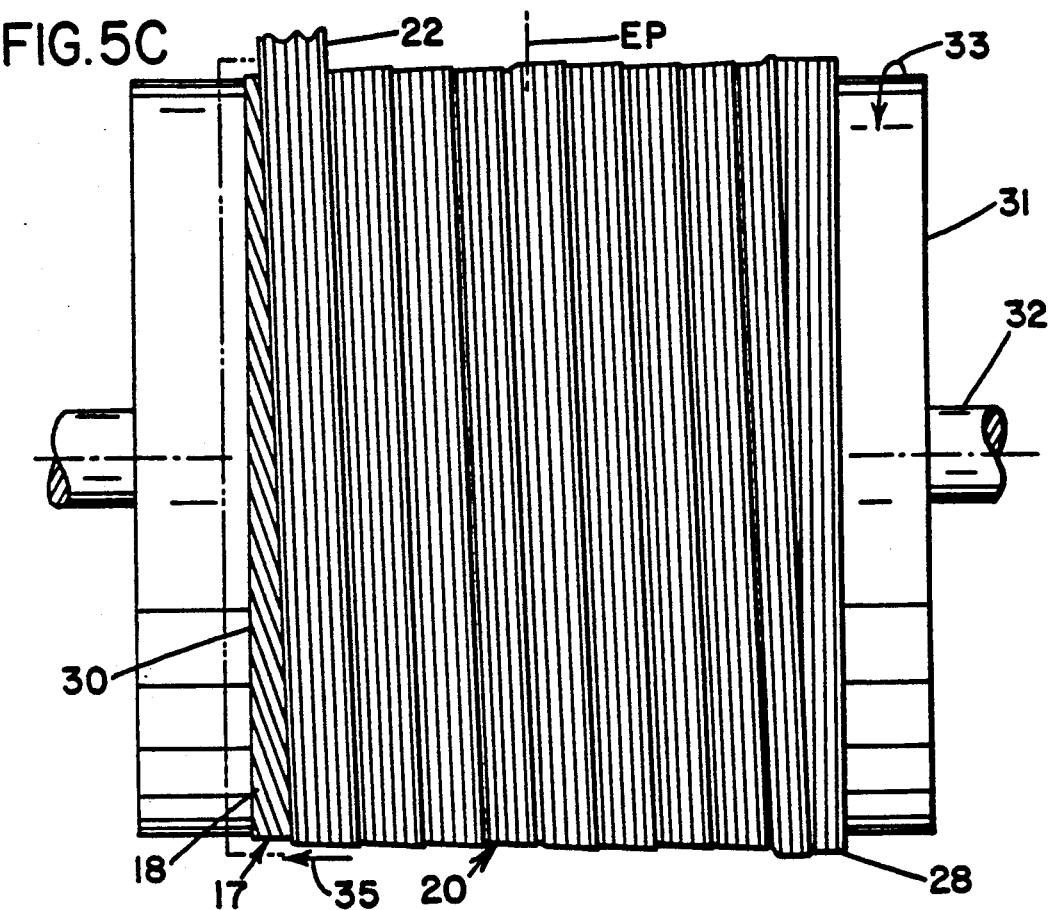

A tire 10 in accordance with a preferred embodiment of the invention has what is commonly referred to in the tire art as a radial ply carcass structure 11. For the purpose of the present invention, a tire has a radial ply carcass structure when the reinforcing cords of the carcass ply, or plies, are oriented at angles in the range of 75° to 90° with respect to the equatorial plane EP of the tire.

As used herein, "radial" and "radially" refer to directions perpendicular to the axis of rotation of a tire, and "axial" and "axially" refer to directions parallel to the axis of rotation of a tire. A plane which is perpendicular to the axis of rotation of a tire and is midway between the sidewalls of the tire is the "equatorial plane".

A tire 10 according to the invention has a pair of axially spaced apart annular beads 12,13 which are substantially inextensible. Each of the beads is located in a bead portion 14,15 having exterior surfaces which are shaped to mate with, and be complementary to, the bead seats and retaining flanges of a rim (not shown) which is specified for use with the tire by an organization which sets industrial standards for tires and rims. Such organizations include The Tire & Rim Association, Inc., The European Tyre & Rim Technical Organisation, and The Japan Automobile Tire Manufacturer Association.

In a pneumatic tire according to the present invention, the radial ply carcass structure 11 comprises at least one carcass ply 16 of side-by-side cords embedded in a suitable elastomeric substance. Each carcass ply extends between the beads 12,13 and has an axially outer portion folded radially and axially outwardly about each bead. It is understood that any number of carcass plies of any suitable material may be employed without deviating from the scope of the present invention. For example, in some sizes of tires, the carcass structure may comprise a single carcass ply of polyester cords, while in other sizes of tires, the carcass structure may comprise two carcass plies of rayon cords.

Preferably, a tire according to the present invention is a tubeless tire having a layer of a low permeability material disposed inwardly of the carcass structure. A belt structure 17 comprising one or more belt plies 18,19 having steel reinforcing cords oriented at angles in the range of 15° to 30° with respect to the equatorial plane EP of the tire is disposed radially outwardly of the carcass structure 11 in a crown region of the tire. While in the preferred embodiment the belt structure comprises two unfolded belt plies of steel cords, it is understood that any suitable combination of folded and unfolded belt plies, of any suitable material, may be employed without deviating from the scope of the present invention. For example, tires according to the invention may employ wire cables of 2+2 or 2×.30 high tensile structures at about 28 cables per inch density.

One of the problems which has been encountered when radial ply tires are operated at high speeds is belt edge separation, in which the axial edges of the belt structure 17 are physically pulled away from the carcass ply structure. In order to reduce, and hopefully prevent, this phenomena it is known in the art to employ a means for restricting 20 the displacement of the axial edges of the belt structure in a radially outward direction. Such a restricting means is commonly referred to in the art as an "overlay" structure 20, and may comprise heat shrinkable cords of nylon, or another suitable material, extending substantially parallel to the equatorial plane EP of the tire and located radially outwardly of at least one belt ply. As used herein, "substantially parallel to the equatorial plane" is understood to mean oriented at 0° to 5° with respect to the equatorial plane.

A ground engageable tread 21 of an elastomeric substance is disposed radially outwardly of the carcass structure 11, belt structure 17, and overlay structure 20, and extends circumferentially thereabout.

An overlay structure 20 according to the invention comprises a single continuous ribbon 22 of the type schematically illustrated in FIG. 2. The ribbon 22 comprises an elastomeric material reinforced by textile cords 23 arranged side-by-side and extending longitudinally of the ribbon. Preferably, the textile cords 23 comprise nylon and may be either monofilament or multifilament cords. Satisfactory overlay structures according to the invention have been manufactured with both 840/2 nylon and 420/2 nylon. Preferably, if 420/2 nylon cords are employed, they consist of two yarns of nylon filaments with said yarns being twisted together with one another, each of said yarns having a denier of 420 and each said cord having a cable twist of not greater than seven, and more preferably having a twist structure of 6×6. Most preferably, the 420/2 nylon cords have an elongation at break of 15% to 20% as determined by ASTM D885, and an elongation of about 7% when subjected to a load of six pounds as determined by ASTM D885. The use of 420/2 nylon cords of this type in overlay structures has been disclosed in commonly owned U.S. Pat. application No. 07/320,649 filed on Mar. 8, 1989, now abandoned. However, it is understood that overlay structures according to the invention may contain textile cords of any suitable material having any suitable cord structure.

While a ribbon 22 of any suitable width A and thickness B may be employed in the practice of the invention, ribbons having a width A of about 25 mm have been found to be quite satisfactory. The thickness B of the ribbon may vary with the gauge of the cords used in the ribbon. For example, ribbons containing 840/2 nylon cords and having a thickness B of 0.032 inches, as well as ribbons containing 420/2 nylon cords and having a thickness B of 0.022 inches have both been used to manufacture satisfactory overlay structures according to the invention. In each of these instances the cord density in the ribbon was thirty-three cords per inch of ribbon width A, so that the ribbons each contained about thirty-three cords.

An overlay structure 20 according to the invention has an axial width C that is at least equal to the axial width D of the belt structure 17. The overlay structure comprises a single ribbon 22 comprising a series of helical convolutions wrapped circumferentially about the belt structure. Next adjacent wraps of the ribbon may be either in overlapping or abutting relationships, or a combination of the two in the same overlay structure. The ribbon has a pair of ends 24,25, with both of said ends being located in close proximity to the equatorial plane EP of the tire. Preferably, both ends 24,25 of the ribbon 22 are located not more than 5% of the axial width of the overlay structure away from the equatorial plane EP of the tire. Most preferably, both ends 24,25 of the ribbon 22 are intersected by the equatorial plane EP of the tire. Preferably, the ends 24,25 of the ribbon are radially aligned with one another. The number of radial layers 26,27,28 of cords in the overlay structure 20 is greater at the axial edges 29,30 of the belt structure than the average number of radial layers of cords in the remainder of the overlay structure. In the preferred embodiment illustrated in FIGS. 1, 3 and 4, there are three radial layers of cords in the overlay structure at the axial edges of the belt structure, but only two radial layers of cords in almost all of the remainder of the overlay structure. It is possible that near the equatorial plane EP of the tire in the proximity of the ends 24,25 of the ribbon and at some areas of overlap of wraps of the ribbon, there may be three radial layers of cords in the overlay structure.

The advantages of a tire having an overlay structure of the present invention are that it has good high speed performance and improved uniformity, that is to say lower radial run-out and force variations, and that the ends of the ribbon are in the proximity of the equatorial plane which is a lower stress area than the areas of the lateral edges of the belt structure. While this overlay structure may require more time to manufacture than other overlay structures, it is believed that any resulting increase in cost is more than offset by savings in costs of downgrading or scrapping tires for not meeting uniformity requirements.

The overlay structure of a pneumatic tire according to the invention has been manufactured using the method illustrated in FIGS. 5A, 5B, 5C, 5D and 5E. The overlay structure may be assembled circumferentially about the belt structure as a subassembly of a tire, or about a belt structure which has already been assembled with a carcass ply structure. The subassembly technique is illustrated in the drawings, but it is understood that the method of manufacturing the overlay structure is essentially the same in either instance.

In this example, there is first provided a belt structure 17 comprising a pair of belt plies 18,19 which are wrapped circumferentially about a cylinder-like drum 31 which is secured to a rotatable shaft 32. A ribbon 22 is provided which comprises an elastomeric substance containing side-by-side nylon cords extending longitudinally of the ribbon. In this particular example, for an overlay structure for a tire of size 195/65 VR 15, the belt structure has an axial width of 178 mm, the ribbon has a width of 25 mm, and the overlay will extend laterally outwardly about 3 mm beyond each lateral edge of the belt structure.

Referring first to FIGS. 5A and 5B, a first end 24 of the ribbon 22 is placed on the radially outermost belt ply 19 in the proximity of, preferably at the axial centerline of the belt structure, and is adhered to the belt structure by the inherently tacky nature of the unvulcanized elastomeric compounds coating the cords of the belt ply and ribbon. The drum and shaft are then rotated in the direction of arrows 33 in FIGS. 5A, 5B, 5C, 5D and 5E while at the same time a let-off device (not shown) supplying the ribbon to the drum traverses laterally towards a first lateral edge 29 of the belt structure in the direction indicated by arrow 34, resulting in the ribbon forming a series of overlapping helical convolutions circumferentially about the belt structure. When the ribbon is disposed such that it extends the desired distance beyond the first lateral edge of the belt structure, in this example 3 mm, the let-off device feeding the ribbon no longer traverses laterally but is dwelled for slightly less than one revolution of the drum. The reason that the dwell is for less than a complete revolution of the drum is that during the movement of the let-off device to the first lateral edge 29 of the belt structure a portion of the edge of the belt structure (in this example, about 43° of circumference) is covered, and then when the let-off device begins to move laterally after the dwell period a further portion of the edge of the belt structure is covered (in this example, about 43° of the circumference). Therefore, in the present example, the dwell at each lateral edge of the overlay structure is for about 276 degrees of the belt and overlay structure. In FIGS. 5A and 5C, the locations of the dwell wraps of the ribbon are shown in phantom lines in order to show their locations with respect to the other turns of the overlay structure.

Figure 5D:
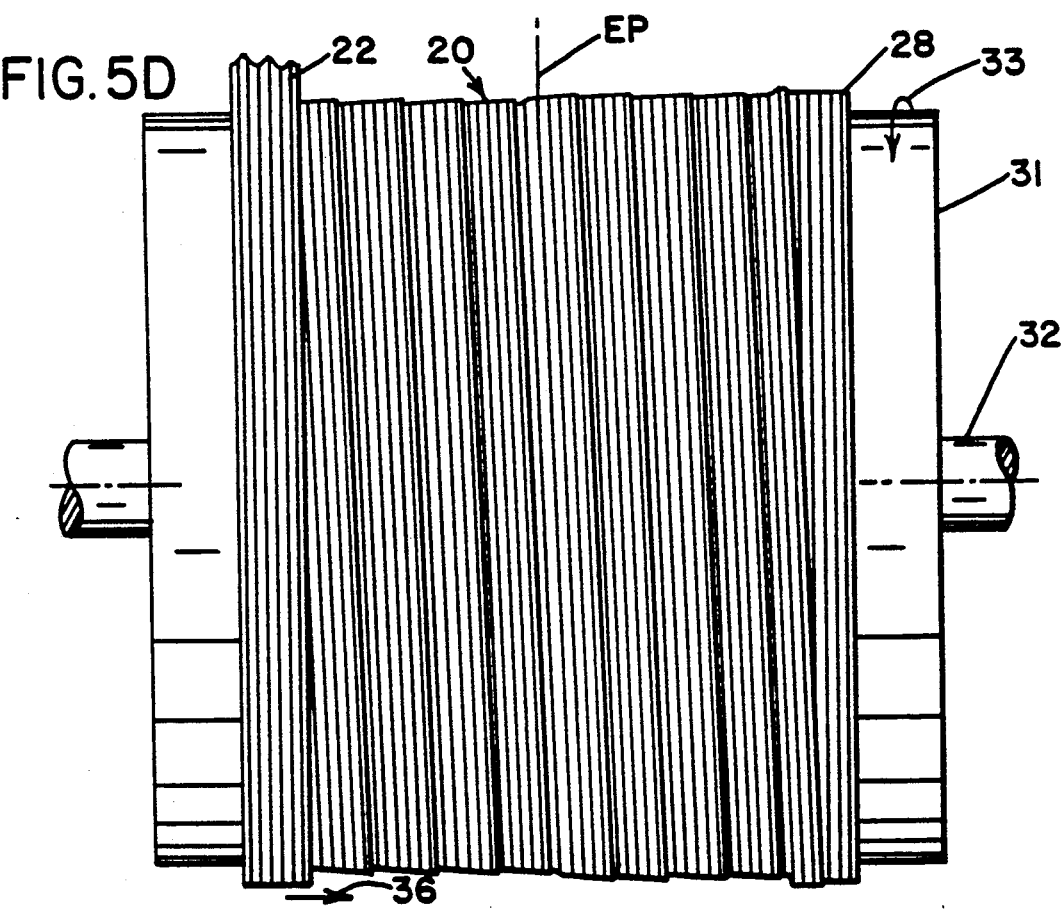

Referring next to FIGS. 5C and 5D, while the drum 31 continues to rotate the let-off device supplying the ribbon 22 to the drum next traverses laterally of the belt structure in the direction indicated by arrow 35 to a location such that the ribbon extends the desired distance beyond the second lateral edge 30 of the belt structure, where it once again dwells for slightly less than one revolution of the drum in the manner described in the preceding paragraph.

Figure 5E:
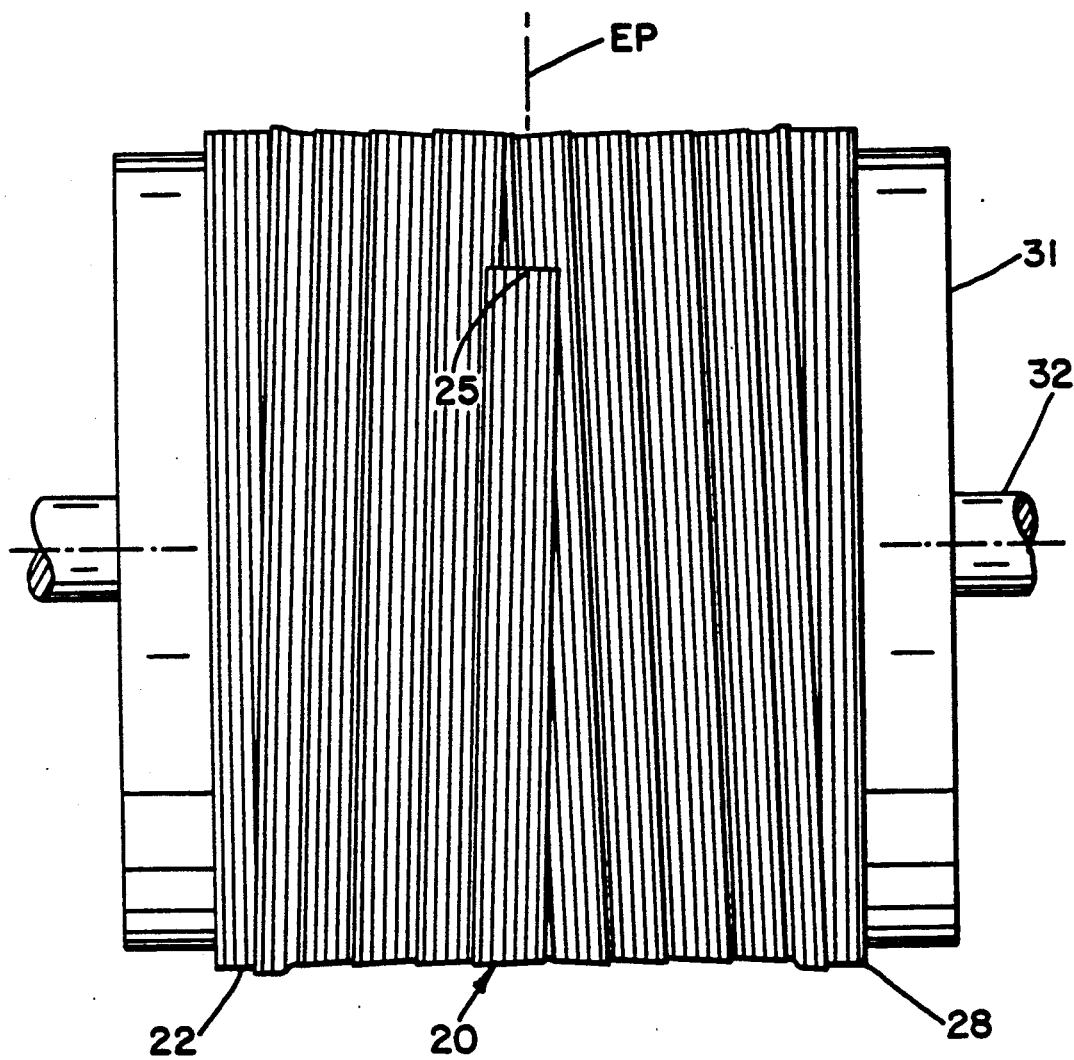

Referring next to FIG. 5E, while the drum continues to rotate the let-off device supplying the ribbon then traverses laterally of the belt structure going back towards the first lateral edge of the belt structure in the direction indicated by arrow 36, and when the ribbon reaches the axial centerline of the belt package, the drum 31 stops rotating and the let-off device supplying the ribbon becomes stationery. At that time, the ribbon is cut and a second end 25 of the ribbon is adhered to the underlying turns of the ribbon at the axial centerline of the belt package. Preferably, the first and second ends 24,25 of the ribbon are circumferentially aligned with one another.

While certain representative embodiments and details have been described for the purpose of illustrating the invention, it will be apparent to those skilled in the art that various changes and modifications may be made therein without departing from the spirit or scope of the invention.

We claim:

1. A method of manufacturing an overlay structure for a pneumatic tire comprising the steps of:
   a. providing a belt structure which is wrapped circumferentially about a cylinder drum which is secured to a rotatable shaft:
   b. providing a ribbon which comprises an elastomeric substance containing side-by-side textile cords extending longitudinally of the ribbon;
   c. supplying the ribbon to the drum by a let-off means and adhering a first end of the ribbon to a radially outermost belt ply of the belt structure in close proximity to an axial centerline of the belt structure:
   d. rotating the drum and shaft while at the same time the let-off device supplying the ribbon traverses laterally to a first lateral edge of the belt structure;
   e. when the ribbon is disposed radially outwardly of the first lateral edge of the belt structure stopping the lateral movement of the let-off means supplying the ribbon while the drum and shaft continue to rotate;
   f. causing the let-off means supplying the ribbon to traverse laterally of the belt structure to a second lateral edge of the belt structure while the drum and shaft continue to rotate;
   g. when the ribbon is disposed radially outwardly of the second lateral edge of the belt structure stopping the lateral movement of the let-off means supplying the ribbon while the drum and shaft continue to rotate;
   h. causing the let-off means supplying the ribbon to traverse laterally of belt structure until the let-off means is aligned with the axial centerline of the belt structure while the drum and shaft continue to rotate; and then
   i. stopping both the rotation of the drum and shaft and the lateral movement of the let-off means supplying the ribbon, cutting the ribbon, and adhering a second end of the ribbon to the underlying ribbon.

* * * * *